(12) United States Patent
Gustafson et al.

(10) Patent No.: US 6,961,212 B1
(45) Date of Patent: Nov. 1, 2005

(54) SHOCK ISOLATION BEARINGS AND TRAVEL LIMIT GAPS IN A SPINDLE MOTOR AND DISK DRIVE USING THE SAME

(75) Inventors: John R. Gustafson, Los Gatos, CA (US); Nils E. Larson, San Jose, CA (US); Mats A. Engwall, San Juan Bautista, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 594 days.

(21) Appl. No.: 09/846,054

(22) Filed: Apr. 30, 2001

(51) Int. Cl.[7] .................................................. G11B 17/02
(52) U.S. Cl. ................................................... 360/99.08
(58) Field of Search ........................ 360/98.07, 99.08, 360/99.07; 310/90, 67 R

(56) References Cited

U.S. PATENT DOCUMENTS

| 5,485,331 A | 1/1996 | Dunfield et al. |
|---|---|---|
| 5,844,748 A | 12/1998 | Dunfield et al. |
| 6,246,137 B1 * | 6/2001 | Obara .......................... 310/90 |
| 6,445,535 B1 * | 9/2002 | Rehm ....................... 360/99.08 |
| 6,563,243 B2 * | 5/2003 | Obara et al. ................... 310/90 |
| 6,671,125 B1 * | 12/2003 | Sumi ....................... 360/99.08 |
| 2002/0191332 A1 * | 12/2002 | Elsing ..................... 360/99.08 |

* cited by examiner

*Primary Examiner*—Angel Castro
*Assistant Examiner*—Mark Blouin
(74) *Attorney, Agent, or Firm*—Alan W. Young, Esq.

(57) ABSTRACT

Disclosed herein are disk drive spindle motors and disk drives using same that include one of more structures that function as travel limit stops that are designed to transfer the load created by a shock impulse to non-essential mechanical features and bypass the bearing structures, thereby keeping the load imposed thereon by the shock impulse below damaging levels. The spindle motor may also include one or more compliant members between the bearing structures and facing surfaces. Such compliant members may be combined with pre-load keepers that preload the bearings by axially compressing the compliant members.

11 Claims, 8 Drawing Sheets

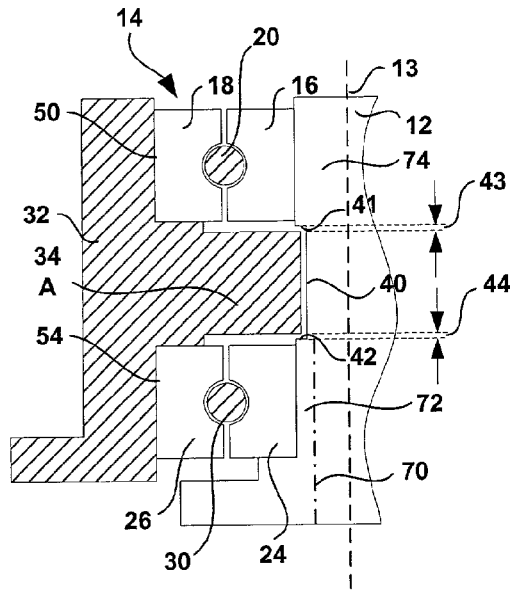
FIG. 3
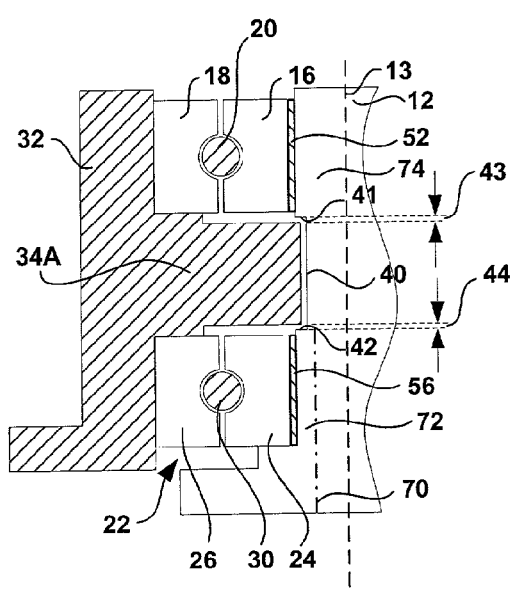 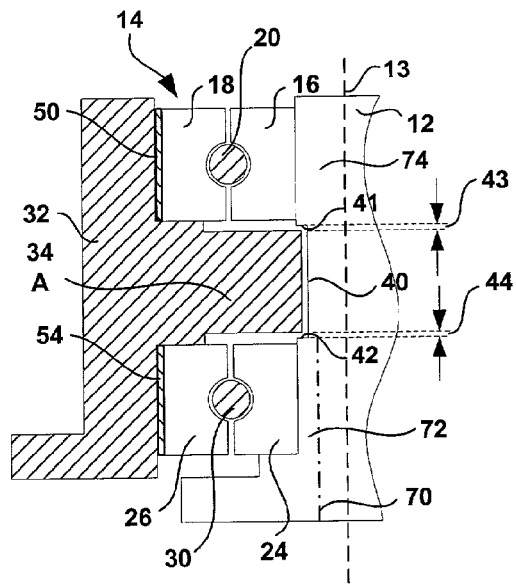
FIG. 4A  FIG. 4B

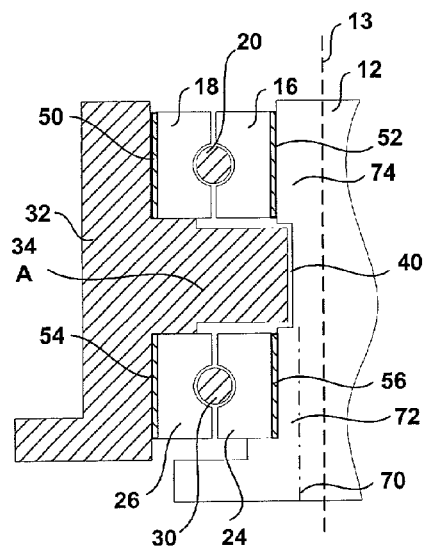
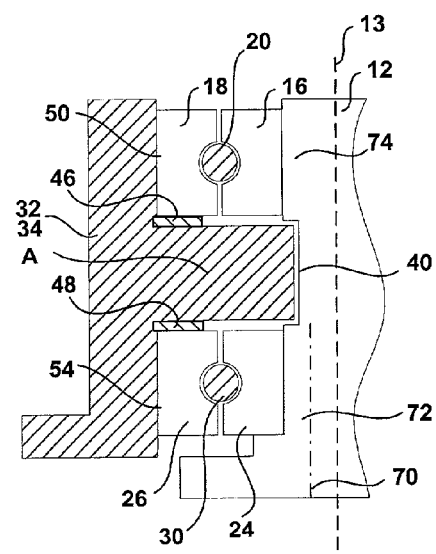
FIG. 5
FIG. 6A
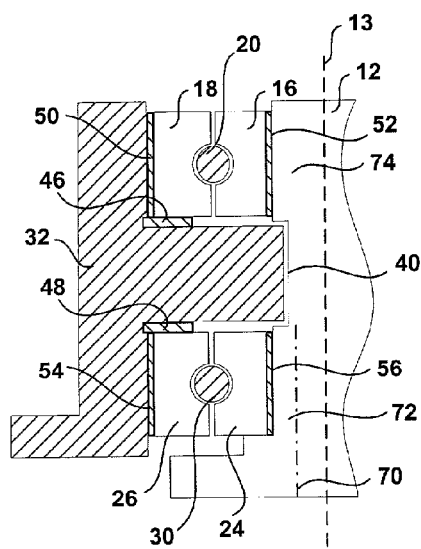
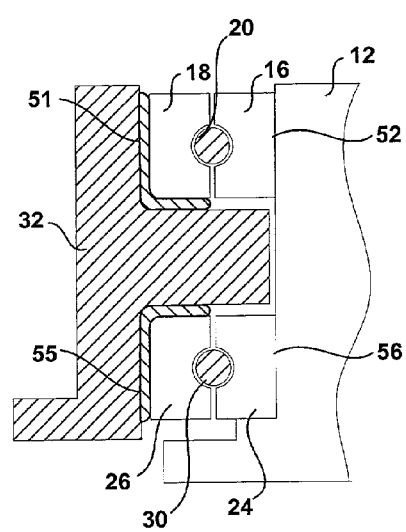
FIG. 6B
FIG. 6C

SHOCK ISOLATION BEARINGS AND TRAVEL LIMIT GAPS IN A SPINDLE MOTOR AND DISK DRIVE USING THE SAME

BACKGROUND OF THE INVENTION

1. Field of the Invention

The present invention relates to disk drives. More particularly, the present invention relates to spindle motors for disk drives and disk drive that use such spindle motors.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a read/write head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the read write/head on the gimbal attached to the load beam. The transfer rate of the data signals is a function of rotational speed of the spindle motor; the faster the rotational speed, the higher the transfer rate. A spindle motor is essentially an electromagnetic device in which the electromagnetic poles of a stator are switched on & off in a given sequence to drive a hub or a shaft in rotation, the hub including a permanent magnetic ring.

Hard disk drives are susceptible to non-operational shocks (shock events occurring when the drive is not in operation) due to both normal and unintended rough handling, both during the manufacture of the drives (during the disk clamp installation process or during qualification testing, for example) and at the hands of end users. Such non-operational shocks may damage the drive by causing permanent deformation of bearings within the spindle motor. There is a need, therefore, for spindle motors and disk drives incorporating such spindle motors that are configured to withstand non-operational and operational shocks of a relatively great magnitude.

As the storage capacity and speed of modern disk drives continues to increase, a number of design and manufacturing challenges have emerged. One such challenge encountered by magnetic hard disk drive designers and manufacturers is to reduce acoustic noise. Acoustic noise is measured according to such standards as the European ISO acoustic standard, the permissible acoustic threshold of which continues to be lowered. Arguably more important, however, is that acoustic noise is often measured by the consumer's own perception. Indeed, consumers tend to form an association between acoustic noise and quality, in that loud drives (those that generate excessive acoustic noise) are perceived to be of lower quality than like performing but quieter drives. Finally, acoustic noise is used throughout the industry as benchmark qualification against competitors' products. Shock events of a high magnitude may also cause increased acoustic noise emanating from even slightly deformed and damaged bearings. There is a continuing need, therefore, to develop and bring to market disk drives that emit little acoustic noise.

Another design challenge that has emerged is that of resonances within the spindle motor disk stack assembly. Such resonances degrade the drive's ability to remain on track during write operations, among other ill effects. Therefore, there is also a need to develop disk drives in which such resonances are sufficiently attenuated so as to enable compensation thereof by the disk's servo system.

SUMMARY OF THE INVENTION

Accordingly, this invention may be regarded as a spindle motor for a disk drive, comprising a spindle motor base; a shaft coupled to the spindle motor base, the shaft defining a longitudinal axis; a first bearing, the first bearing including a first inner race attached to the shaft; a first outer race and a first ball set between the first inner race and the first outer race. A second bearing is spaced-apart from the first bearing along the longitudinal axis, and includes a second inner race attached to the shaft; a second outer race and a second ball set between the second inner race and the second outer race. A rotary hub surrounds the shaft, and the spindle motor also includes a hub extension between the first and second bearings that extends from the rotary hub toward the longitudinal axis beyond the first and second outer races and between the first and second inner races.

The hub extension may be unitary and integral with the rotary hub or may be distinct from the rotary hub. The first and second inner races may be attached to the shaft and the spindle motor may further comprise a first compliant member between the first outer race and the rotary hub and a second compliant member between the second outer race and the rotary hub. The first and second outer races may be attached to the rotary hub and the spindle motor may further comprise a third compliant member between the first inner race and the shaft and a fourth compliant member between the second inner race and the shaft. The first and second outer races may be attached to the rotary hub and the hub extension may extend between the first and second bearings so as to form a first gap between the hub extension and at least a portion of the first inner race and a second gap between the hub extension and at least a portion of the second inner race. The hub extension may be dimensioned such that the first gap spans a first distance that is less than a non-operational deflection and greater than an operational deflection, the non-operational deflection and the operational deflection being defined as a deflection of the first inner race relative to the first outer race that would cause permanent deformation of the first bearing should the spindle motor be subjected to a shock event when the spindle motor is not in operation and is in operation, respectively. Similarly, the hub extension may be dimensioned such that the second gap spans a second distance that is less than a non-operational deflection and greater than an operational deflection, the non-operational deflection and the operational deflection being defined as a deflection of the second inner race relative to the second outer race that would cause permanent deformation of the second bearing should the spindle motor be subjected to a shock event when the spindle motor is not in operation and is in operation, respectively. The hub extension may be configured such that the first and/or second gaps is selected to be between about 0.0001 and about 0.0012 inches in width, for example.

The shaft may define a recessed portion between the first and second inner races, the recessed portion defining a first facing surface and a second facing surface, each of the first and second facing surfaces being perpendicular to the longitudinal axis. The hub extension may extend partially into the recessed portion to define a third gap with the first facing surface and a fourth gap with the second facing surface. The hub extension may be dimensioned such that the third and fourth gaps each span a third distance that is less than a non-operational deflection and greater than an operational deflection, the non-operational deflection and the operational deflection being defined as a deflection of the first inner race relative to the first outer race that would cause permanent deformation of the first bearing should the spindle motor be subjected to a shock event when the spindle motor is not in operation and is in operation, respectively. The hub extension may be configured such that the third and fourth gaps are each selected to be between about 0.0001 and about 0.0012 inches in width, for example.

A fifth compliant member may be disposed between the first outer race and the rotary hub and a sixth compliant member may be disposed between the second outer race and the rotary hub. A seventh compliant member may be disposed between the hub extension and the first outer race and an eighth compliant member may be disposed between the hub extension and the second outer race. A ninth compliant member may be disposed between the first inner race and the shaft and a tenth compliant member may be disposed between the second inner race and the shaft. An eleventh compliant member may be disposed on a first portion of the hub extension that faces the first facing surface and a twelfth compliant member may be disposed on a second portion of the hub extension that faces the second facing surface. The spindle motor may further include a twenty-first compliant member disposed on a first portion of the hub extension that faces the first inner race and a twenty-second compliant member disposed on a second portion of the hub extension that faces the second inner ring.

The first outer race may define a first hub extension contact surface and the second outer race may define a second hub extension contact surface that faces the first hub extension contact surface. The hub extension may contact the first and second hub extension contact surfaces and the spindle motor may further comprise a first preload keeper attached to the shaft, the first preload keeper loading at least the first bearing by exerting a force on the first inner race, directed toward the second bearing. A thirteenth compliant member may be disposed between the preload keeper and the first inner race and between the first inner race and the shaft, and a fourteenth compliant member may be disposed between the second inner race and the shaft and between the second inner race and the base.

The spindle motor may be configured so as to define an axial travel limit gap, the axial travel limit gap enabling the spindle motor to displace and at least partially close the axial travel limit gap without undergoing permanent deformation of the first and second bearings under the influence of a shock event in an axial direction. The axial travel limit gap may be selected to be between about 0.0001 and 0.0012 inches in width, for example. The second outer race and the spindle motor base may be mutually spaced apart so as to define the axial travel limit gap. The preload keeper and the first outer race may be mutually space apart so as to define the axial travel limit gap. The spindle motor may further include a stator support configured to support a stator within the spindle motor, and the hub may include a lower bearing ring portion. The stator support and the lower bearing ring portion may then be mutually spaced apart so as to define the axial travel limit gap.

The spindle motor may be configured so as to define a radial travel limit gap, the radial travel limit gap enabling the spindle motor to displace and at least partially close the radial travel limit gap without undergoing permanent deformation of the first and second bearings under the influence of a shock event in a radial direction. The radial travel limit gap may also be selected to be between about 0.0001 and 0.0012 inches in width, for example. The spindle motor may also include a stator support for supporting a stator, the stator support being integral with the spindle motor base and the rotary hub may further include a second bearing support portion for supporting the second bearing and the stator support and the second bearing support portion may be mutually spaced apart so as to define the radial travel limit gap. The rotary hub further may include a second bearing support portion for supporting the second bearing and the second bearing support portion and the second outer race may be mutually spaced apart so as to define the radial travel limit gap. The hub extension may define a third facing surface that is parallel to the longitudinal axis and this third facing surface may be spaced apart from the shaft so as to define the radial travel limit gap. The rotary hub may define a fourth facing surface that is parallel to the longitudinal axis and the preload keeper may define a first preload keeper surface that is parallel to and faces the fourth facing surface, the fourth facing surface and the first preload keeper surface being spaced apart so as to define the radial travel limit gap.

The present invention is also a disk drive, comprising a disk drive base; a spindle motor attached to the disk drive base, the spindle motor comprising: a spindle motor base; a shaft coupled to the spindle motor base, the shaft defining a longitudinal axis; a first bearing, the first bearing including: a first inner race attached to the shaft; a first outer race; a first ball set between the first inner race and the first outer race; a second bearing spaced-apart from the first bearing along the longitudinal axis, the second bearing including: a second inner race attached to the shaft; a second outer race; a second ball set between the second inner race and the second outer race; and a rotary hub surrounding the shaft, and a hub extension between the first and second bearings that extends from the rotary hub toward the longitudinal axis beyond the first and second outer races and between the first and second inner races.

The present invention also includes a spindle motor for a disk drive, comprising: a rotating shaft, the rotating shaft defining a longitudinal axis; a first bearing, the first bearing including: a first inner race attached to the rotating shaft; a first outer race; a first ball set between the first inner race and the first outer race; a second bearing spaced-apart from the first bearing along the longitudinal axis, the second bearing including: a second inner race attached to the rotating shaft; a second outer race; a second ball set between the second inner race and the second outer race; a hub surrounding the shaft, the hub defining a hub extension configured to exert a pre-loading force on the first inner race, the pre-loading force being directed toward the second inner race; a spindle motor base, the spindle motor base including a base extension between the first and second bearings that extends toward the longitudinal axis beyond the first and second outer races.

The spindle motor may also include a seventeenth compliant member disposed between the first outer race and the spindle motor base, and an eighteenth compliant member disposed between the second outer race and the spindle motor base. The seventeenth and eighteenth compliant members may be non-conductive or may be conductive. A nineteenth compliant member may be disposed between the first inner race and the rotating shaft, and a twentieth compliant member may be disposed between the second inner race and the rotating shaft.

The foregoing and other features of the invention are described in detail below and set forth in the appended claims.

BRIEF DESCRIPTION OF THE DRAWINGS

FIG. 3 is a cross-sectional drawing of a portion of a spindle motor, according to a still further embodiment of the present invention.

FIG. 4A. is a cross-sectional drawing of a portion of a spindle motor, according to yet another embodiment of the present invention.

FIG. 4B is a cross-sectional drawing of a portion of a spindle motor, according to another embodiment of the present invention.

FIG. 5 is a cross-sectional drawing of a portion of a spindle motor, according to a further embodiment of the present invention.

FIG. 6A is a cross-sectional drawing of a portion of a spindle motor, according to another embodiment of the present invention.

FIG. 6B is a cross-sectional drawing of a portion of a spindle motor, according to yet another embodiment of the present invention.

FIG. 6C is a cross-sectional drawing of a portion of a spindle motor, according to yet another embodiment of the present invention.

DESCRIPTION OF THE PREFERRED EMBODIMENTS

Figure 10:
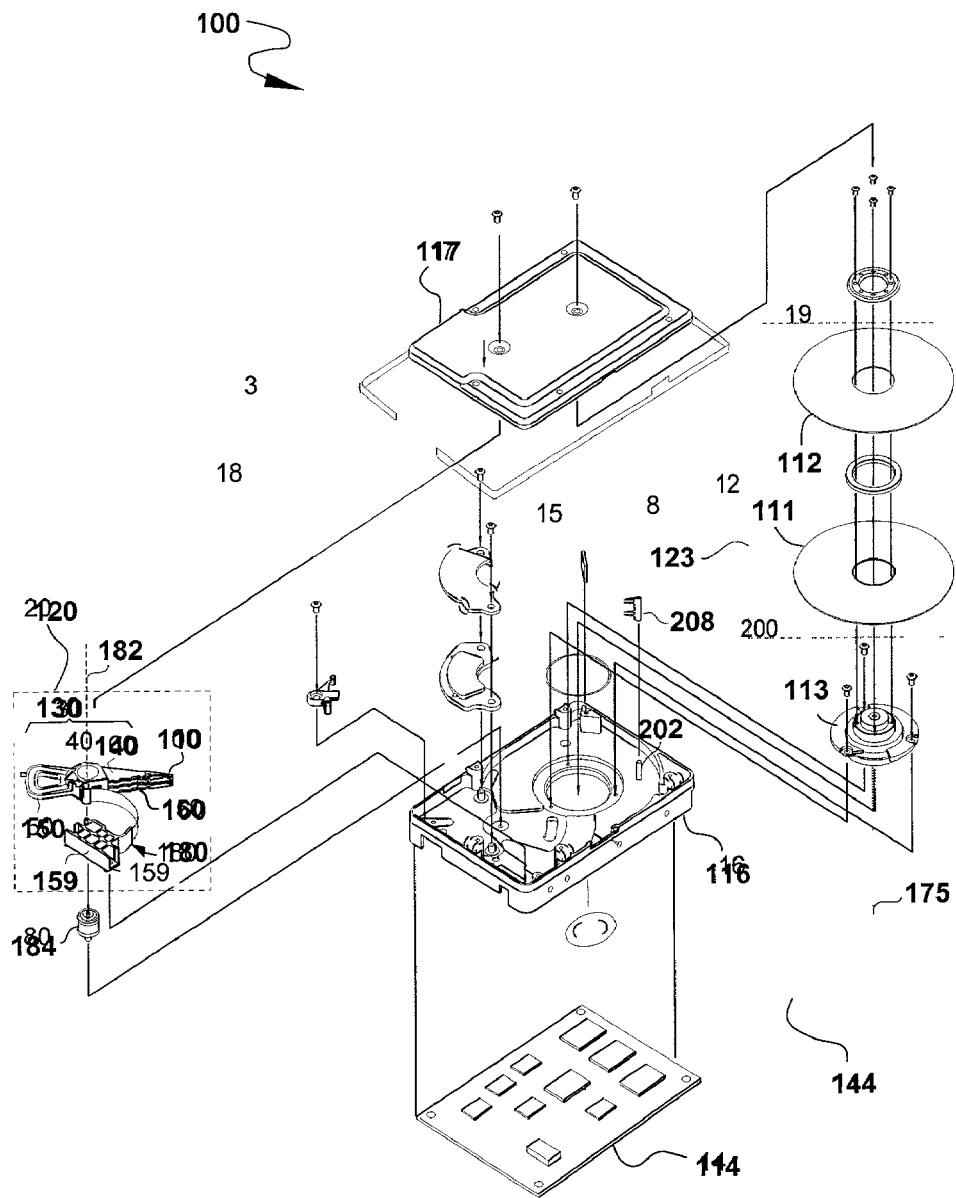
FIG. 10 is an exploded view of a magnetic disk drive according to an embodiment of the present invention.

FIG. 10 shows the principal components of a disk drive such as a magnetic hard disk drive 100 constructed in accordance with this invention. With reference to FIG. 10, the preferred disk drive 100 is an integrated drive electronics (IDE) drive comprising a Head Disk Assembly (HDA) 144 and a Printed Circuit Board Assembly (PCBA) 114.

The HDA 114 includes a base 116 and a cover 117 attached to the base 116 that collectively house a disk stack 123 that includes a plurality of magnetic disks (of which only a first disk 111 and a second disk 112 are shown in FIG. 1), a spindle motor 1113 attached to the base 116 for rotating the disk stack 123, a head stack assembly 120, and a pivot bearing cartridge 184 (such as a stainless steel pivot bearing cartridge, for example) that rotatably supports the HSA 120 on the base 116. Preferably, the spindle motor 113 rotates the disk stack 123 at a constant angular velocity about a spindle motor rotation axis 175. The preferred HSA 120 comprises a swing-type or rotary actuator assembly 130, at least one Head Gimbal Assembly HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head and a lift tab located at or near its far distal end that is biased toward and moveable over the disks 111, 112. The flex cable assembly 180 includes a flex circuit cable and a flex clamp 159. The HSA 120 is pivotally secured to the base 116 via the pivot-bearing cartridge 184 so that the head at the distal end of the HGA 110 may be moved over a recording surface of the disks 111, 112. The pivot-bearing cartridge 184 enables the HSA 120 to pivot about a pivot axis, shown in FIG. 1 at reference numeral 182. The storage capacity of the HDA 111 may be increased, as shown in FIG. 1, by including additional disks in the disk stack 123 and by an HSA 120 having a vertical stack of HGAs 110 supported by multiple actuator arms 160.

Figure 1A:
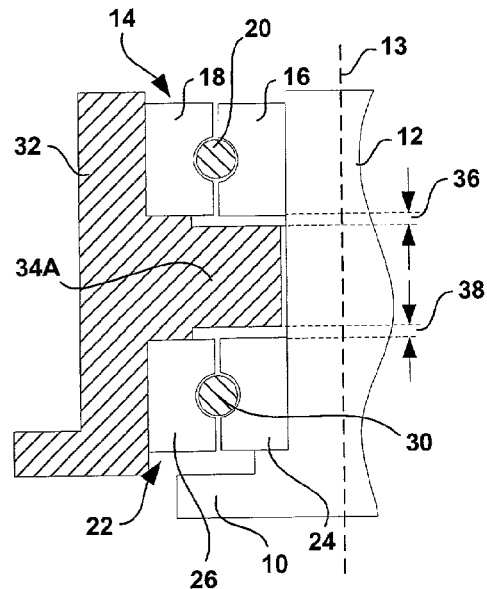
FIG. 1A. is a cross-sectional drawing of a portion of a spindle motor, according to an embodiment of the present invention.

FIGS. 1A through 7B are cross-sectional representations of a portion of a spindle motor 113, according to embodiments of the present invention. It is to be understood that only a portion of the left-hand side of the spindle motor 113 according to the present invention is shown in each of the drawings 1A through 7B and that the right-hand side thereof is a mirror image of the shown left-hand side. As shown in FIGS. 1A and 1B, the spindle motor 113 includes a spindle motor base 10 to which a shaft 12 (only a portion of the shaft 12 being shown in FIGS. 1A and 1B) is coupled. As shown, the shaft 12 defines a longitudinal axis 13. The spindle motor includes first bearing 14 and a second bearing 22 that enable the hub 32 to rotate about the shaft 12. The first bearing 14 includes a first inner race 16 attached to the shaft 12, a first outer race 18 and a first ball set 20 between the first inner race 16 and the first outer race 18. The second bearing 22 is spaced-apart from the first bearing 14 along the longitudinal axis 13 and includes a second inner race 24 attached to the shaft 12, a second outer race 26 and a second ball set 30 disposed between the second inner race 24 and the second outer race 26. The rotary hub 32 surrounds the shaft 12. The spindle motor, according to the present invention, also includes a hub extension between the first bearing 14 and the second bearing 22. As shown in both FIGS. 1A and 1B, the hub extension extends from the rotary hub 32 toward the longitudinal axis 13 beyond the first and second outer races 18, 26. Indeed, as shown in FIGS. 1A and 1B, the hub extension 34A, 34B extends beyond the first and second outer races 18, 26 so as to include a surface that faces the first inner race 16 and a surface that faces the second inner race 24. The hub extension may be an integral and unitary portion of the rotary hub 32, as shown in FIG. 1A at reference numeral 34A or may be a structure that is distinct and separate from the hub 32, as shown in FIG. 1B at reference numeral 34B.

The first and second outer races 18, 26 may be attached to the rotary hub 32. According to the present invention, the hub extension 34A or 34B may extend between the first and second bearings 14, 22 so as to form a first gap 36 between the hub extension 34A, 34B and at least a portion of the first inner race 16 and a second gap 38 between the hub extension 34A, 34B and at least a portion of the second inner race 24. The first gap 36, according to the present invention, acts as a travel limit stop during a non-operational shock event that includes an axial component (parallel to the longitudinal axis 13), so as to limit the travel of the first inner race 16 relative to the first outer race 18. Indeed, during a shock event that includes a significant component directed in the axial direction, the first inner race 16 may undergo a displacement toward the second inner race 24 and the first gap 36 may be reduced to zero, thereby bypassing the first bearing 14 and transferring the load imposed upon the first bearing 14 by the shock event to the hub extension 34A, 34B and the hub 32. Similarly, the second gap 38, according to the present invention, also acts as a travel limit stop during a shock event that includes a axial component (parallel to the longitudinal axis 13), so as to limit the travel of the second inner race 24 relative to the second outer race 26. Indeed, during a shock event that includes a significant component directed in the axial direction, the second inner race 24 may undergo a displacement toward the first inner race 16 and the second gap 38 may be reduced to zero, thereby bypassing the second bearing 22 and transferring the load imposed upon the second bearing 22 by the shock event to the hub extension 34A, 34B and the hub 32.

The hub extension 34A, 34B may be dimensioned such that the first gap 36 spans a first distance that is less than a non-operational deflection and that is greater than an operational deflection. Generally, according to the present invention, a lower limit of the gaps disclosed herein may be defined as smaller than a deflection that would cause permanent damage to the be first and/or second bearings 14, 22 and/or the spindle motor. A non-operational deflection, according to the present invention, may be defined as a deflection of the first inner race 16 relative to the first outer race 18 that would cause permanent deformation of the first bearing 14 should the spindle motor be subjected to a shock event when the spindle motor is not in operation (e.g., the hub 32 is not currently spinning). In contrast, an operational shock event may be defined (relative to the first bearing 14) as a deflection of the first inner race 16 relative to the first outer race 18 that would cause permanent deformation of the first bearing 14 should the spindle motor be subjected to a shock event when the spindle motor is in operation. Likewise, the hub extension 34A, 34B may be dimensioned such that the second gap 38 spans a second distance that is less than a non-operational deflection and that is greater than an operational deflection. In this case, the non-operational deflection may be defined (relative to the second bearing 22) as a deflection of the second inner race 24 relative to the second outer race 26 that would cause permanent deformation of the second bearing 22 should the spindle motor be subjected to a shock event when the spindle motor is not in operation. Similarly, an operational shock, according to an embodiment of the present invention may be defined (relative to the second bearing 22) as a deflection of the second inner race 24 relative to the second outer race 26 that would cause permanent deformation of the second bearing 22 should the spindle motor be subjected to a shock event while in operation (e.g., spinning). According to the present invention, the first and second gaps 36, 38 may be configured to be between about 0.0001 and about 0.0012 inches in width, for example.

According to further embodiments of the present invention, the spindle motor may include one or more compliant (elastomeric, for example) members to isolate the first and second bearings 14, 22 from the shaft 12 and/or other structures within the spindle motor. An example of such compliant members is shown at reference numerals 50 and 54 in FIG. 2. The remaining structures of FIG. 2 have been described relative to FIGS. 1A and 1B and a detailed description thereof is omitted here. As shown therein, the first and second inner races 16, 24 are attached to the shaft 12, and the spindle motor further includes a compliant member 50 between the first outer race 18 and the rotary hub 32 and another compliant member 54 between the second outer race 26 and the rotary hub 32. The embodiment of FIG. 2 may also advantageously include a separate hub extension 34B (as shown and described relative to FIG. 1A), rather than the unitary hub extension 34A shown. Compliant members such as shown at 50 and 54 in FIG. 2 lower acoustic noise by reducing transmission of vibrations in the first and second bearing 14, 22 to the shaft 12 and the HDA, as there is no metal-to-metal path from the shaft 12 to the hub 32. Moreover, compliant members such as shown at 50, 54 may reduce and damp the overall bearing stiffness, thereby causing the primary structural resonances such as pitch (including forward and backward gyro modes) and axial modes to occur at lower frequencies with damping. The compliant members may be formed of or include rubber, plastic sleeves or even O-rings, for example.

The present spindle motor may include a recessed portion 40 defined within the shaft 12 between the first and second inner races 16, 24, as shown in FIG. 3. The recessed portion 40 itself defines a first facing surface 41 and a second facing surface 42, each of the first and second facing surfaces 41, 42 being perpendicular to the longitudinal axis 13 of the shaft 12. According to an embodiment of the present invention, the hub extension—configured either as shown at 34A in FIG. 1A or as shown at 34B in FIG. 1B-*extends* partially into the recessed portion 40 to define a third gap 43 with the first facing surface 41 and a fourth gap 44 with the second facing surface 42. In the embodiments of the present invention including a recessed portion 40, the shaft 12 is a split shaft that includes a shaft base portion 72 and a shaft top portion 74 (delimited by the dashed line 70) that are mated to one another through a threaded interface, via a press fit, adhesive, swage or by other means, as known to those of skill in this art.

The hub extension (configured as shown at 34A or 34B) may be dimensioned such that the third and fourth gaps 43, 44 each span a third distance that is less than a non-operational deflection and greater than an operational deflection. Again, the non-operational deflection is defined as a deflection of the first inner race 16 relative to the first outer race 18 and of the second inner race 24 relative to the second outer race 26 that would cause permanent deformation of the first and second bearings 14, 22, respectively, should the spindle motor be subjected to a shock event while not in operation. The operational shock, in contrast, is defined as the same deflections, but occurring while the spindle motor is in operation (e.g., spinning). Such third and fourth gaps 43, 44 are preferably each selected to be between about 0.0001 inches and about 0.0012 inches in width, for example. Small loads occasioned by shock events of slight magnitude may be carried entirely by the first and second bearings 14, 22. Greater loads occasioned by shock events having a axial component of greater magnitude may cause the hub extension 34A, 34B to close the third gap 43 or the fourth gap 44 (the width of the third gap 43 or of the fourth gap 44 becomes zero), depending upon the direction in which the axial component of the shock event is directed. The resulting load, therefore, is no longer carried by the first and second bearings 14, 22, but is, instead, carried by the structures that define the gap (in this case, the hub extension 34A or 34B and the first facing surface 41 or the second facing surface 44 of the spindle motor shaft 12). The third and fourth gaps 43, 44, therefore, act as travel limit stops, preventing excessive compression and subsequent deformation of the first and second bearings 14, 22. It is to be noted that gaps or travel limits stops according to the present invention (such as third and fourth gaps 43, 44) need only be large enough (as a measure of their lower size limit) to insure that there is no contact between the rotating (hub 32, for example) and stationary parts (such as the shaft 12) during operation of the spindle motor. In other words, the gaps or travel limit step disclosed herein may advantageously be dimensioned so as there is no contact between the structures defined the gaps or travel limit stops during shock loads that are not large enough to cause permanent deformation of the first and/or second bearings 14, 22, to the spindle motor or to the drive incorporating the present spindle motor.

As shown in FIG. 4A, the first and second outer races 18, 26 may be attached to the rotary hub 32 and the spindle motor may further comprise a compliant member 52 between the first inner race 16 and the shaft 12 and another compliant member 56 between the second inner race 24 and the shaft 12. In this manner, the shaft 12 is isolated from the first and second bearings 14, 22, further damping vibrations, reducing acoustic noise and shaping the pulse response of the spindle motor in response to a shock event. The presence of the compliant members 50, 54, 52 and/or 56 may allow the first and second bearings 14, 22 to withstand a shock event having a significant radial component without permanently deforming the bearings 14, 22, as the compliant members are relatively more elastically deformable than the bearings 14, 22, thereby absorbing at least a portion of the load imposed on the bearings 14, 22 by the shock event.

Figure 1B:
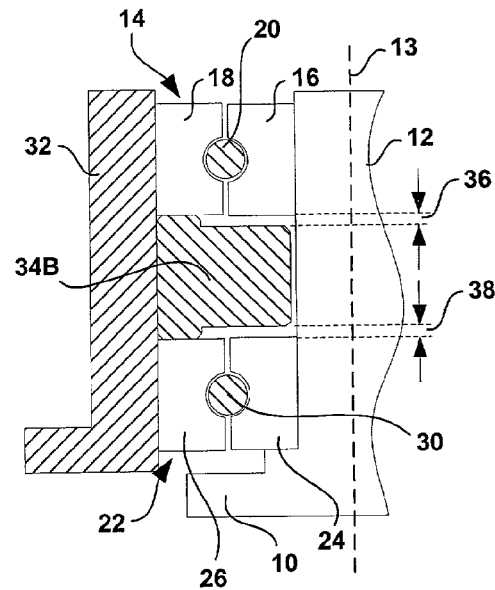
FIG. 1B. is a cross-sectional drawing of a portion of a spindle motor, according to a further embodiment of the present invention.
Figure 2:
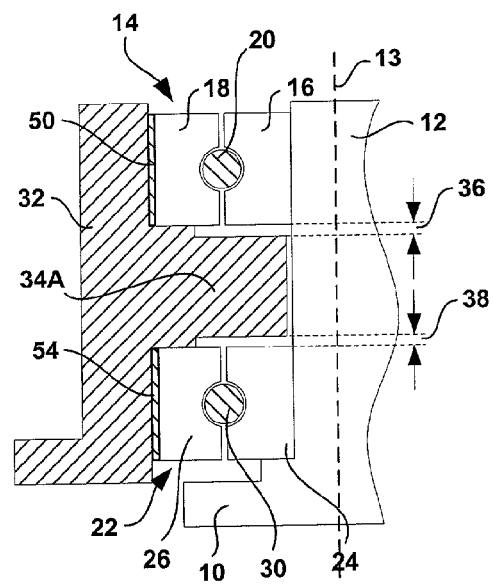
FIG. 2. is a cross-sectional drawing of a portion of a spindle motor, according to another embodiment of the present invention.

Alternatively or in addition to such compliant members 52, 56, the present spindle motor may include a compliant member 50 between the first outer race 18 and the rotary hub 32 and another compliant member 54 between the second outer race 26 and the rotary hub 32, as shown in FIG. 4B. Spindle motors such as shown in FIGS. 4A and 4B are better able to withstand shock events directed in both the axial and radial directions, the radial direction being defined herein as being perpendicular to the axis 13. Indeed, the compliant members 50, 54, 52 and/or 56 allow a greater displacement of the first and second bearings 14, 22 in the radial direction, which allows the radial gap to be reduced to zero without permanently damaging the first and second bearings 14, 22. As shown in FIG. 5, the spindle motor according to the present invention may include each of the compliant members 50, 54, 52 and 56, as well as the gaps 43 and 44. Such a spindle motor may include a hub extension 34A (as shown) or 34B, as shown in FIG. 1B. Additionally, the shaft 12 may define a recessed portion 40 (as shown in FIG. 5) or not include such a recessed portion 40, as shown in FIGS. 1A and 1B.

According to a still further embodiment of the present invention, the spindle motor may include another compliant member 46 disposed between the hub extension 34A (or 34B) and the first outer race 18 and a counterpart compliant member 48 disposed between the hub extension 34A (or 34B) and the second outer race 26, as shown in FIG. 6A. Such compliant members 46 and 48 provide a bearing preload and additional compliance and sway space for the first and second bearings 14, 22. As shown in FIG. 6B, when compliant members 46 and 48 are provided, compliant member 50 may also be provided between the first outer race 18 and the rotary hub 32 and compliant member 54 may be provided between the second outer race 26 and the rotary hub 32. Additional compliant members 52 and 56 may also be provided between the first and second inner races 16, 24 and the shaft 12. Compliant members 46 and 50 may be advantageously combined as compliant member 51 that covers at least a portion of the two surfaces of the first outer race 18 that are in contact with the hub 32 and the hub extension 34A or 34B, as shown in FIG. 6C. Likewise, the members 48 and 54 may be advantageously combined as compliant member 55 (as also shown in FIG. 6C) that covers at least a portion of the two surfaces of the second outer race 26 that are in contact with the hub 32 and the hub extension 34A or 34B. FIG. 6C shows an embodiment wherein the shaft 12 does not define a recessed portion 40.

Figure 7A:
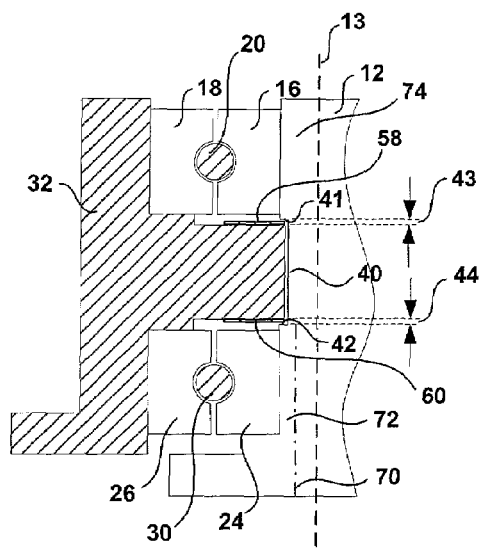
FIG. 7A is a cross-sectional drawing of a portion of a spindle motor, according to a still further embodiment of the present invention.

FIG. 7A shows an embodiment of a spindle motor wherein further compliant members 58 and 60 are disposed on the hub extension 34A. Specifically, the compliant member 58 is disposed on the first portion of the hub extension 34A, 34B that faces a first facing surface 41 of the recessed portion 40 and the compliant member 60 is disposed on a second portion of the hub extension 34A, 34B that faces the second facing surface 42 of the recessed portion 40. This embodiment combines a compliant member with the travel stop gaps 43 and 44 to provide additional protection for the first and second bearings 14, 22 during an axially-directed shock event. The compliant members 58 and 60 may dampen some of the higher frequencies of the shock, whereas the facing surfaces 41 and 42 formed by the recessed portion 40 of the shaft 12 limit the displacement of the hub 32 and/or the hub extension 34A or 34B to thereby protect the first and second bearings 14, 22 from permanent damage and/or deformation when subjected to a shock event.

Figure 7B:
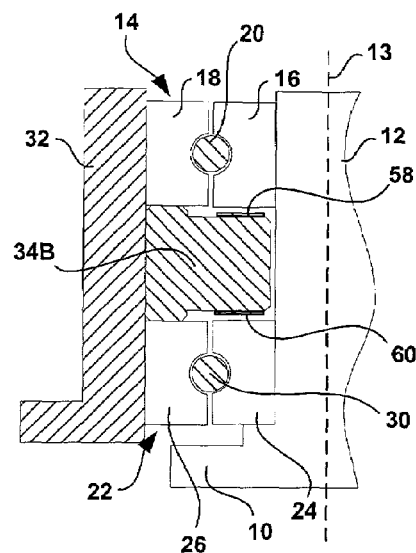
FIG. 7B is a cross-sectional drawing of a portion of a spindle motor, according to a still further embodiment of the present invention.

Similarly, FIG. 7B shows an embodiment of the present invention wherein the compliant members 58 and 60 are disposed on the hub extension 34B. Specifically, the compliant member 58 is disposed on the surface of the hub extension 34B that faces the first inner race 16 and the compliant member 60 is disposed on the surface of the hub extension 34B that faces the second inner race 24. The compliant members 58 and 60 may dampen some of the higher frequencies of the shock and, in combination with the hub extension 34B, limit the travel of the first inner race 16 relative to the first outer race 18 and limit the travel of the second inner race 24 relative to the second outer race 26, thereby protect the first and second bearings 14, 22 from permanent damage and/or deformation when subjected to a shock event. It is to be noted that the embodiment of FIG. 7A could incorporate a hub extension 34B instead of the shown hub extension 34A and that the embodiment of FIG. 7B could readily incorporate the hub extension 34A rather than the shown hub extension 34B.

Figure 8:
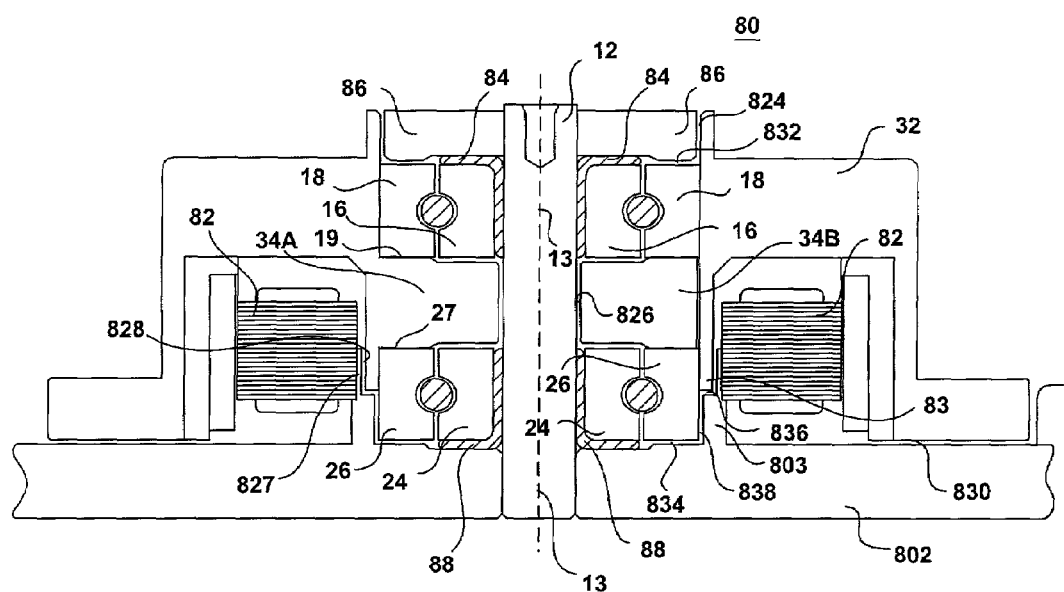
FIG. 8 is a cross-sectional drawing of a rotating hub-type spindle motor, according to an embodiment of the present invention.

FIG. 8 shows a cross-sectional view of a spindle motor 80 and illustrates additional aspects of the present invention. Note that, for illustrative purposes only, the right-hand side of the spindle motor 80 is shown with a discrete hub extension 34B, whereas the left-hand side thereof shows an integral hub extension 34A. It is understood that, in practice, a spindle motor would have either a discrete hub extension 34B or an integral hub extension 34A, but not both. Those structures that are identical or similar to those shown in FIGS. 1–7 bear the same reference numerals and a detailed description of these structures is omitted here.

As shown, the first outer race 18 defines a first hub extension contact surface 19 and the second outer race 26 defines a second hub extension contact surface 27 that faces the first hub extension contact surface 19 and the hub extension 34A or 34B contacts the first and second hub extension contact surfaces 19, 27. The spindle motor shown in FIG. 8 also includes a preload keeper 86 attached to the shaft 12, the first preload keeper 86 loading at least the first bearing 14 by exerting a force on the first inner race 16, the exerted force being directed toward the second bearing 22. Another compliant member 84 may be disposed between the preload keeper 86 and the first inner race 16 and between the first inner race 16 and the shaft 12. Likewise, a compliant member 88 may be disposed between the second inner race 24 and the shaft 12 and between the second inner race 24 and the spindle motor base 802. In this fashion, the preload keeper 86 may be used to preload the first bearing 14 by axially compressing the compliant members 84.

The present invention includes additional features that are designed to transfer the load created by a shock impulse to non-essential mechanical features, to bypass the first and second bearings 14, 22 and to keep the load imposed thereon below damaging levels. This is achieved by taking advantage of the inherent tight tolerance of the bearing structures and by exploiting the fact that the first and second bearings 14, 22 may be modeled as stiff springs that deflect under load. According to the present invention, the spindle motor 80 may be configured to include one or more axial travel limit gaps. An axial travel limit gap enables a portion of the spindle motor 80 to displace and at least partially close the axial travel limit gap without the bearings 14, 22 undergoing permanent deformation under the influence of a shock event in an axial direction. Such axial travel limit gaps, according to the present invention, may be selected to be between about 0.0001 and 0.0012 inches in width, for example.

One such axial travel limit gap, as shown at reference numeral 834, may be defined by the spacing between the second outer race 26 and the spindle motor base 802. Under the influence of a shock event at least partially directed in the axial direction (parallel to longitudinal axis 13 of the shaft 12), the axial travel limit gap 834 will close (become zero width) and transfer the load to the spindle motor base 802, rather than the second bearing 22. Another such axial travel limit gap is shown at 832, which gap is defined by the mutual spacing of the preload keeper 86 and the first outer race 18. In this manner, the travel of the first outer race 18 toward the preload keeper 86 is limited to the width of the axial travel limit stop 832, which gap is dimensioned to prevent permanent deformation of the first bearing 14 when under load.

The base 802 of the spindle motor 80 may include a stator support 803 configured to support the second bearing 22 within the spindle motor 80 and the hub 32 may include a lower bearing ring portion 83. According to the present invention, the stator support 803 and the lower bearing ring portion 83 of the hub 32 may be mutually spaced apart so as to define another axial travel limit gap, as shown at 836.

Similarly, the spindle motor according to the present invention may also and/or alternatively be configured so as to define one or more radial travel limit gaps. The radial travel limit gap(s) enables a portion of the spindle motor to displace and at least partially close the radial travel limit gap without undergoing permanent deformation under the influence of a shock event in a radial direction. The width of the radial travel limit gap may be selected to be between about 0.0001 and 0.0012 inches, for example.

One example of such a radial travel limit gap is shown at reference 828 in FIG. 8. The radial travel limit stop 828 is defined by the mutual spacing of the stator support 827 that supports the stator 82 relative to the lower bearing ring portion 83 of the hub 32. The stator support 827 may be integral with the spindle motor base 802. The spindle motor according to the present invention may also be configured to include another such radial travel limit stop, as shown at 838. Radial travel limit stop 838 is defined by the spacing between the second outer race 26 and the portion of the spindle base 802 that supports the second outer race. Irrespective of whether the hub extension is configured as shown at 34A or 34B, the hub extension 34A or 34B define a facing surface that faces the shaft 12 and that is parallel to the longitudinal axis 13 thereof. The shaft 12 and this facing surface, as shown in FIG. 8, may define a radial travel limit stop 826. Another example of a radial travel limit stop is shown at 824. As shown, a surface of a portion of the hub 32 is parallel to the longitudinal axis 13 and faces the preload keeper 86. The preload keeper 86, in turn, defines a preload keeper surface that is parallel to and faces this surface. The spacing between these two surfaces, shown in FIG. 8 at 824, may be configured and dimensioned to function as a radial travel limit stop gap. The present spindle motor may be configured to incorporate axial and/or radial travel stop gaps other than shown in FIG. 8. All such travel stop gaps should be considered to fall within the scope of the present invention.

Figure 9:
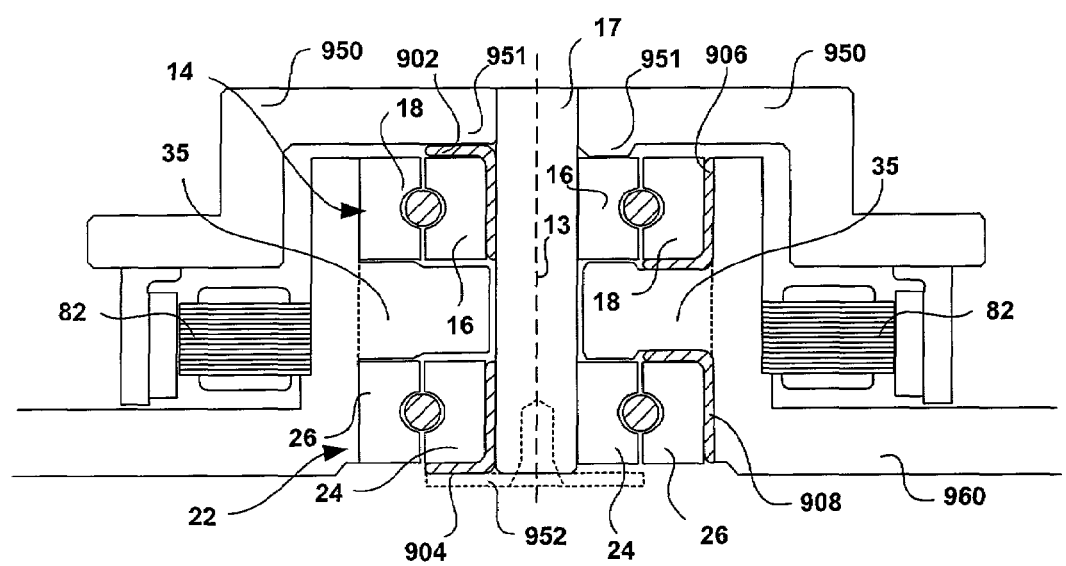
FIG. 9 is a cross-sectional drawing of rotating shaft-type spindle motor, according to a further embodiment of the present invention.

The present invention may also be applied to a spindle motor having a rotating shaft. FIG. 9 shows a cross-sectional view of such a rotating shaft spindle motor. Again, the cross-sectional view of FIG. 9 is not symmetrical and is designed to illustrate various embodiments of the present invention. As shown, such a spindle motor includes a rotatable shaft 17 that defines a longitudinal axis 13. The hub 950 surrounds the shaft 17 and defines a hub extension 951 that is configured to exert a pre-loading force on the first inner race 16 that is directed toward the second inner race 24. The spindle motor of FIG. 9 may also include a lower preload keeper 952 (shown in dashed lines) that is attached to the rotating shaft 17 and exerts a pre-loading force on the second inner race 24. The spindle motor also includes a spindle motor base 960 that includes a base extension 35 between the first and second bearings 14, 22 that extends toward the longitudinal axis 13 beyond the first and second outer races 18, 26. Compliant members may be disposed between the first and second bearings and other facing and/or support structures within the spindle motor. For example, as shown at 906, a compliant member may be disposed between the first outer race 18 and the spindle motor base 960 and another compliant member 908 may be disposed between the second outer race 26 and the spindle motor base 960. Alternatively, a compliant member 902 may be disposed between the first inner race 16 and the rotating shaft 17 and a compliant member 904 may be disposed between the second inner race 24 and the rotating shaft 17. Such compliant members may be configured as an "L" shape to dampen vibrations and protect the first and second bearings 14, 22 from shock events in both the axial and radial directions. Alternatively, the compliant members may be shaped as an "T" and dampen vibrations in only the axial or only the radial direction, depending upon its placement within the spindle motor. The compliant members 902, 904, 906 and/or 908, as with all compliant members disclosed herein, may either be conductive or non-conductive. The embodiment of FIG. 9 may also include one or more radial travel limit stops and/or one or more axial travel limit stops, similar to those described relative to FIG. 8. Advantageously, the presence of such axial and/or radial travel limit stops and/or compliant members enables the first and second bearings 14, 22 to withstand shock events of greater magnitude than would be the case without these structures, irrespective of the axial or radial direction of such shocks.

Figure 11:
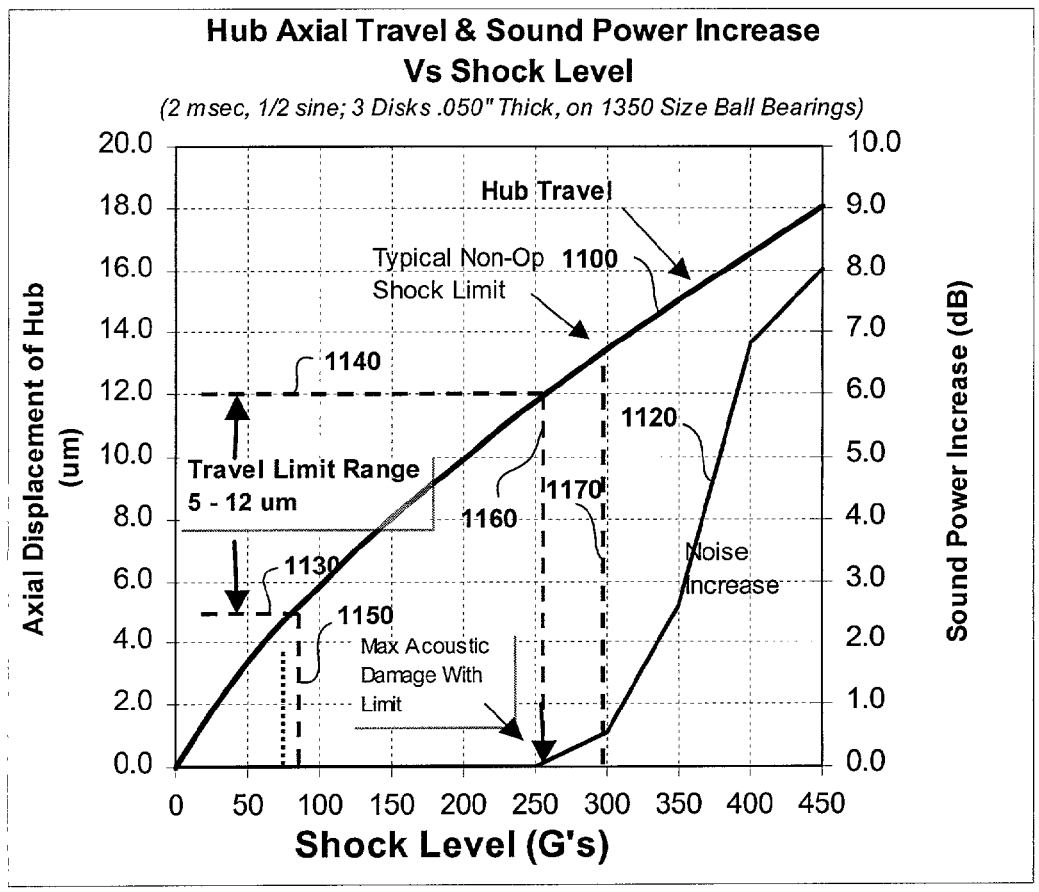
FIG. 11 is a graph of hub axial travel versus shock level and sound power increase, for a spindle motor in which no compliant members are provided, according to the present invention.
Figure 12:
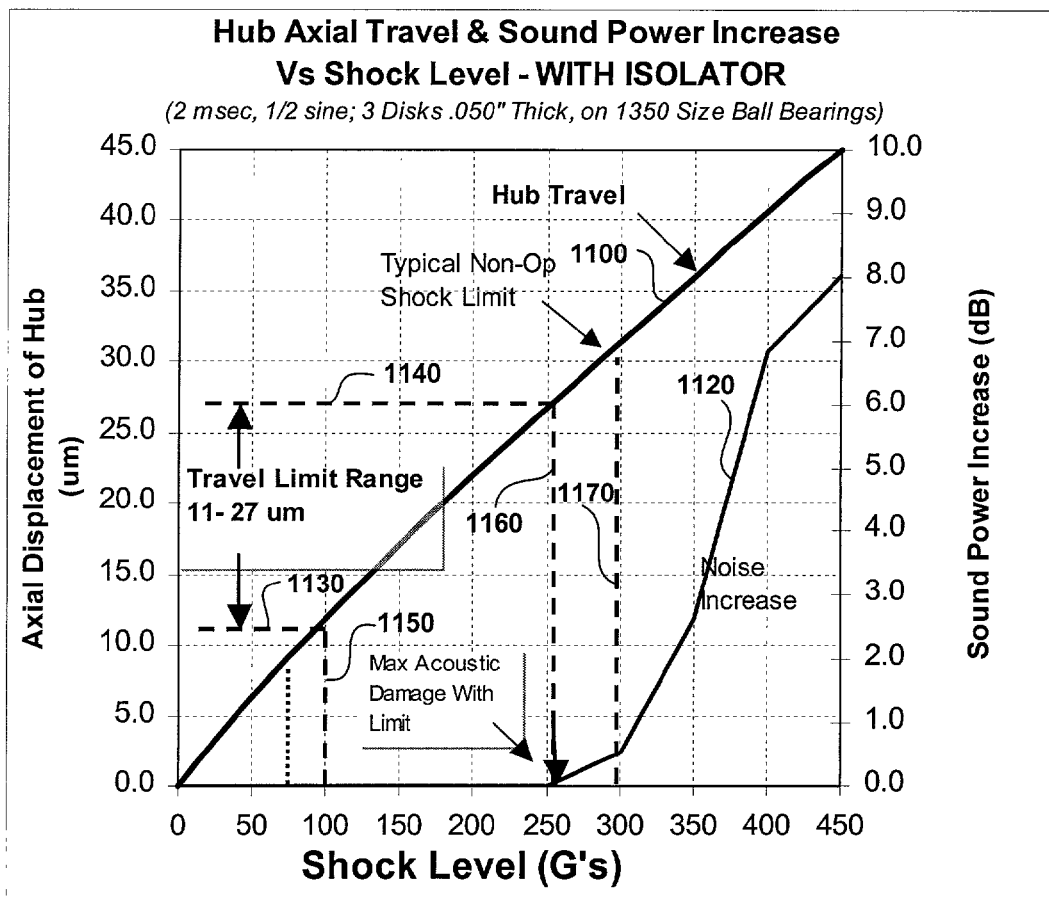
FIG. 12 is a graph of hub axial travel versus shock level and sound power increase, illustrating an embodiment of the present invention wherein the spindle motor is provided with one or more compliant members.

FIG. 11 is a graph of hub 32 axial travel versus shock level and sound power increase when the spindle motor is not provided with any compliant members, according to the present invention. FIG. 12 is a graph similar to that of FIG. 11, but illustrating an embodiment wherein the spindle motor is provided with one or more compliant members, according to the present invention. In both FIGS. 11 and 12, the X axis is Shock level—2 msec ½ sine and curve 1100 represents travel (deflection) of the hub 32 relative to spindle motor base (i.e. bearing deflection) during shock—left scale. Curve 1120 shows the acoustic increase (in dB) due to shock—right scale. The dashed line 1170 at 300 g's represents a typical non-operational shock specification, whereas the dashed line at 60 g's represents an operational shock specification. The lines referenced by 1130 and 1140 represent the desired range for the travel limit stops of the present invention. The dashed lines referenced by 1150 and 1160 represent the shock levels (and associated acoustic increases) corresponding to the travel lines 1130 and 1140, respectively.

As shown in FIG. 11 (no compliant member case), the dashed line 1170 at 300 g's represents typical non-operational shock specification and the bottom of dashed line 1170 crosses the acoustic increase line 1120 at about 1 dB, whereas the top of the dashed line 1170 crosses the deflection line 1100 at about 13.5 $\mu$m Thus, to prevent acoustic damage, the deflection should be kept lower than about 13.5 $\mu$m, in the example illustrated in FIG. 11. To prevent contact during an operational shock event, the minimum gap width should be about 5 $\mu$m. To close the gap before permanent damage occurs, bottoming out should occur before about 12 $\mu$m (or 13.5 $\mu$m maximum). This range of 5 $\mu$m to 12 $\mu$m corresponds to about 0.0002 inches to about 0.0005 inches.

FIG. 12 shows the case wherein a compliant member has been added in series with the bearings 14, 22 according to the present invention. FIG. 12 assumes that the stiffness of the series compliant member is about equal to that of the bearings 14, 22. In this configuration, the disk pack resonance frequencies drop and the isolation of the first and second bearings 14, 22 increases. The dashed line at 1170 at 300 g's again represents a typical non-operational shock specification. As shown, the line 1170 crosses the acoustic increase line 1120 at about 1 dB and crosses the hub deflection line 1100 at about 31 $\mu$m. Therefore, to prevent acoustic damage, the hub travel should be limited to less than about 31 $\mu$m. To avoid contact during operational shocks, the minimum gap clearance should be about 11 $\mu$m. Moreover, to close the gap before the bearings 14, 22 sustain permanent damage, the bottoming out should occur before about 27 $\mu$m (or a maximum of 31 $\mu$m). This range of 11 $\mu$m to 27 $\mu$m corresponds to the gap range of about 0.00043 inches to about 0.0011 inches.

What is claimed is:

1. A spindle motor for a disk drive, comprising:
   a spindle motor base;
   a shaft coupled to the spindle motor base, the shaft defining a longitudinal axis;
   a first bearing, the first bearing including:
      a first inner race attached to the shaft;
      a first outer race;
      a first ball set between the first inner race and the first outer race;
   a second bearing spaced-apart from the first bearing along the longitudinal axis, the second bearing including:
      a second inner race attached to the shaft;
      a second outer race;
      a second ball set between the second inner race and the second outer race; and a one-piece rotary hub surrounding the shaft, the rotary hub defining a hub extension that is disposed between the first and second bearings and that extends away from the rotary hub toward the longitudinal axis, the hub extension of the rotary hub being configured to reach beyond the first and second outer races and between the first and second inner races.

2. The spindle motor of claim 1, wherein the first and second outer races are attached to the rotary hub and wherein the hub extension extends between the first and second bearings so as to form a first gap between the hub extension and at least a portion of the first inner race and a second gap between the hub extension and at least a portion of the second inner race.

3. The spindle motor of claim 2, wherein the hub extension is dimensioned such that the first gap spans a first distance that is less than a non-operational deflection and greater than an operational deflection, the non-operational deflection and the operational deflection being defined as a deflection of the first inner race relative to the first outer race that would cause permanent deformation of the first bearing should the spindle motor be subjected to a shock event when the spindle motor is not in operation and is in operation, respectively.

4. The spindle motor of claim 2, wherein the hub extension is dimensioned such that the second gap spans a second distance that is less than a non-operational deflection and greater than an operational deflection, the non-operational deflection and the operational deflection being defined as a deflection of the second inner race relative to the second outer race that would cause permanent deformation of the second bearing should the spindle motor be subjected to a shock event when the spindle motor is not in operation and is in operation, respectively.

5. The spindle motor of claim 2, wherein the hub extension is configured such that at least one of the first and second gaps is selected to be between about 0.0001 and about 0.0012 inches in width.

6. A disk drive comprising:
   a disk drive base;
   a spindle motor attached to the disk drive base, the spindle motor comprising:
      a spindle motor base;

a shaft coupled to the spindle motor base, the shaft defining a longitudinal axis;

a first bearing, the first bearing including:
   a first inner race attached to the shaft;
   a first outer race;
   a first ball set between the first inner race and the first outer race;

a second bearing spaced-apart from the first bearing along the longitudinal axis, the second bearing including:
   a second inner race attached to the shaft;
   a second outer race;
   a second ball set between the second inner race and the second outer race; and a rotary hub surrounding the shaft, the one-piece rotary hub defining a hub extension that is disposed between the first and second bearings and that extends away from the rotary hub toward the longitudinal axis, the hub extension of the rotary hub being configured to reach beyond the first and second outer races and between the first and second inner races.

7. The disk drive of claim 6, wherein the first and second outer races are attached to the rotary hub and wherein the hub extension extends between the first and second bearings so as to form a first gap between the hub extension and at least a portion of the first inner race and a second gap between the hub extension and at least a portion of the second inner race.

8. The disk drive of claim 7, wherein the hub extension is dimensioned such that the first gap spans a first distance that is less than a non-operational deflection and greater than an operational deflection, the non-operational deflection and the operational deflection being defined as a deflection of the first inner race relative to the first outer race that would cause permanent deformation of the first bearing should the spindle motor be subjected to a shock event when the spindle motor is not in operation and is in operation, respectively.

9. The disk drive of claim 7, wherein the hub extension is dimensioned such that the second gap spans a second distance that is less than a non-operational deflection and greater than an operational deflection, the non-operational deflection and the operational deflection being defined as a deflection of the second inner race relative to the second outer race that would cause permanent deformation of the second bearing should the spindle motor be subjected to a shock event when the spindle motor is not in operation and is in operation, respectively.

10. The disk drive of claim 7, wherein the hub extension is configured such that at least one of the first and second gaps is selected to be between about 0.0001 and about 0.0012 inches in width.

11. A spindle motor for a disk drive, comprising:
   a rotating shaft, the rotating shaft defining a longitudinal axis;
   a first bearing, the first bearing including:
      a first inner race attached to the rotating shaft;
      a first outer race;
      a first ball set between the first inner race and the first outer race;
   a second bearing spaced-apart from the first bearing along the longitudinal axis, the second bearing including:
      a second inner race attached to the rotating shaft;
      a second outer race;
      a second ball set between the second inner race and the second outer race;
   a hub surrounding the shaft, the hub defining a hub extension configured to exert a pre-loading force only on the first inner race, the pre-loading force being directed toward the second inner race;
   a spindle motor base, the spindle motor base including a base extension between the first and second bearings that extends toward the longitudinal axis beyond the first and second outer races.

* * * * *